US012664402B2

(12) United States Patent
Guo et al.

(10) Patent No.: US 12,664,402 B2
(45) Date of Patent: Jun. 23, 2026

(54) SYSTEMS AND METHODS FOR VISUAL QUESTION ANSWERING USING IMAGE RELEVANT TEXTUAL PROMPTS

(71) Applicant: Salesforce, Inc., San Francisco, CA (US)

(72) Inventors: Jiaxian Guo, Sydney (AU); Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 775 days.

(21) Appl. No.: 18/150,068

(22) Filed: Jan. 4, 2023

(65) Prior Publication Data

US 2024/0119257 A1 Apr. 11, 2024

Related U.S. Application Data

(60) Provisional application No. 63/377,462, filed on Sep. 28, 2022.

(51) Int. Cl.
*G06V 10/25* (2022.01)
*G06F 16/583* (2019.01)
*G06N 3/042* (2023.01)
*G06V 10/82* (2022.01)

(52) U.S. Cl.
CPC ........... *G06N 3/042* (2023.01); *G06F 16/583* (2019.01); *G06V 10/25* (2022.01); *G06V 10/82* (2022.01)

(58) Field of Classification Search
CPC ........ G06V 10/82; G06V 10/25; G06N 3/042; G06F 16/583
See application file for complete search history.

(56) References Cited

U.S. PATENT DOCUMENTS

| | | | |
|---|---|---|---|
| 10,929,392 B1 * | 2/2021 | Cheng | G06N 3/044 |
| 2018/0293508 A1 * | 10/2018 | Ko | G06F 16/355 |
| 2020/0057925 A1 * | 2/2020 | Tang | G06V 10/771 |
| 2021/0109956 A1 * | 4/2021 | Su | G06N 3/0442 |
| 2021/0232773 A1 * | 7/2021 | Wang | G06F 40/284 |
| 2022/0245838 A1 * | 8/2022 | Wu | G06N 3/0442 |
| 2023/0121539 A1 * | 4/2023 | Gupta | G09B 21/006 |
| 2024/0104851 A1 * | 3/2024 | Narayana | G09B 29/007 |

* cited by examiner

*Primary Examiner* — Beau D Spratt
(74) *Attorney, Agent, or Firm* — Haynes and Boone, LLP

(57) ABSTRACT

Embodiments described herein provide systems and methods for providing zero-shot visual question answering. A first image and a first question relating to a visual content of the first image are received. One or more image captions relevant to the first question are determined using a visual-language neural model by determining portions of the first image relevant to the first question. Answer candidates are generated using the one or more image captions, answer candidates. Synthetic question-answer pairs are generated using synthetic questions generated using the answer candidates and the answer candidates. A prompt is generated by concatenating the synthetic question-answer pairs. A first answer to the first question is generated using a language network model using an input of the first question prepended with the prompt.

20 Claims, 16 Drawing Sheets

Computing Device 100

Memory 120

Processor 110

Img2Prompt VQA Module 130

Image-Question Matching Submodule 131

Filter Submodule 133

Caption Submodule 132

Question Generation Submodule 134

Data Interface 115

Input 140

Output 150

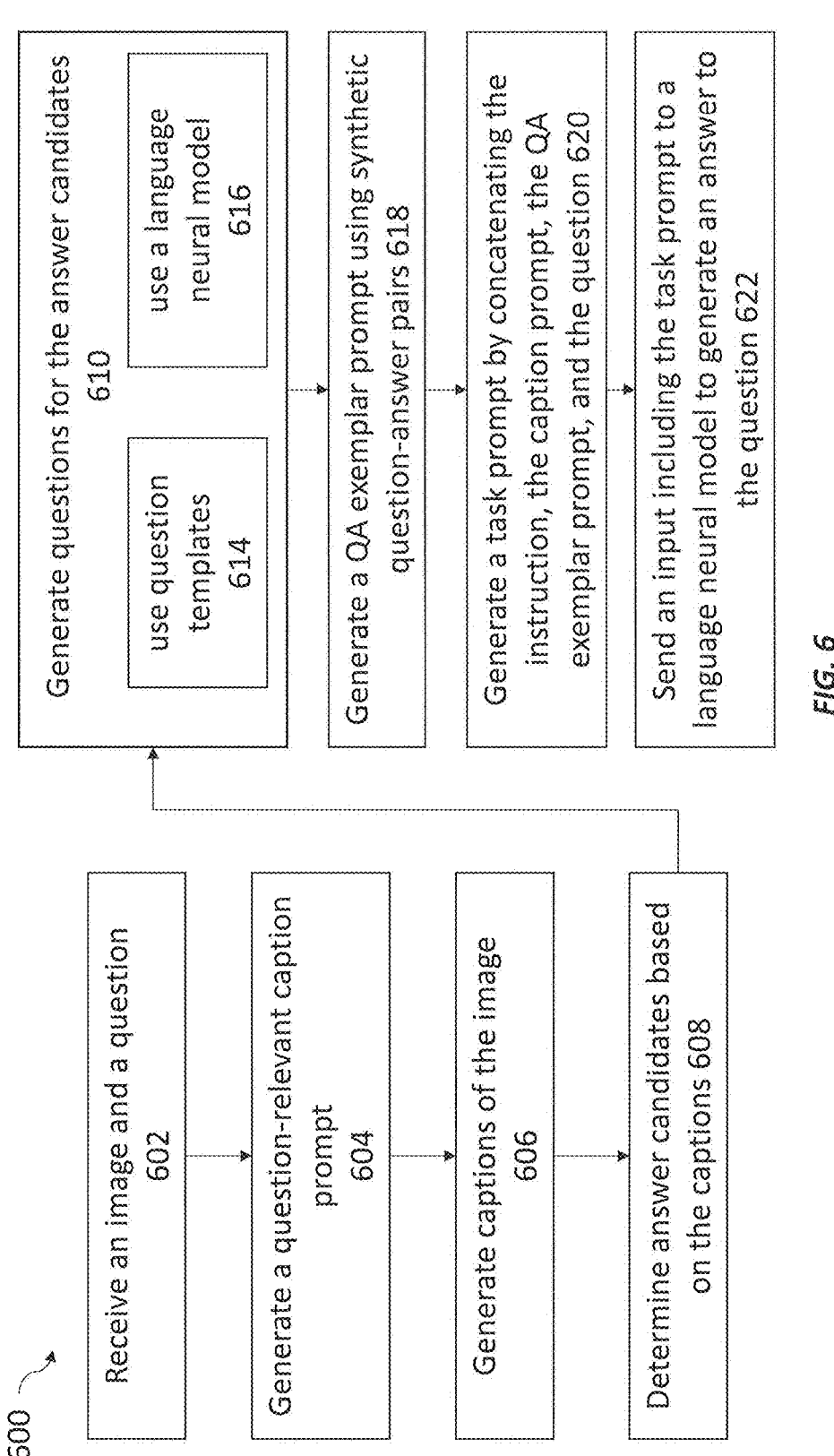

Receive an image and a question 602

Generate a question-relevant caption prompt 604

Generate captions of the image 606

Determine answer candidates based on the captions 608

Generate questions for the answer candidates 610 use question templates 614 use a language neural model 616

Generate a QA exemplar prompt using synthetic question-answer pairs 618

Generate a task prompt by concatenating the instruction, the caption prompt, the QA exemplar prompt, and the question 620

Send an input including the task prompt to a language neural model to generate an answer to the question 622

Table 1

| Prompt Template | Caption Prompt | Exemplar Prompt | VQAv2 val | OK-VQA |
|---|---|---|---|---|
| Instruction | ✗ | ✗ | 18.1 | 3.3 |
| Instruction + Captions | ✓ | ✗ | 46.1 | 23.5 |
| Instruction + Question-Answer Pairs | ✗ | ✓ | 57.9 | 41.1 |
| Instruction + Captions + Question-Answer Pairs | ✓ | ✓ | 59.5 | 41.8 |

*FIG. 7*

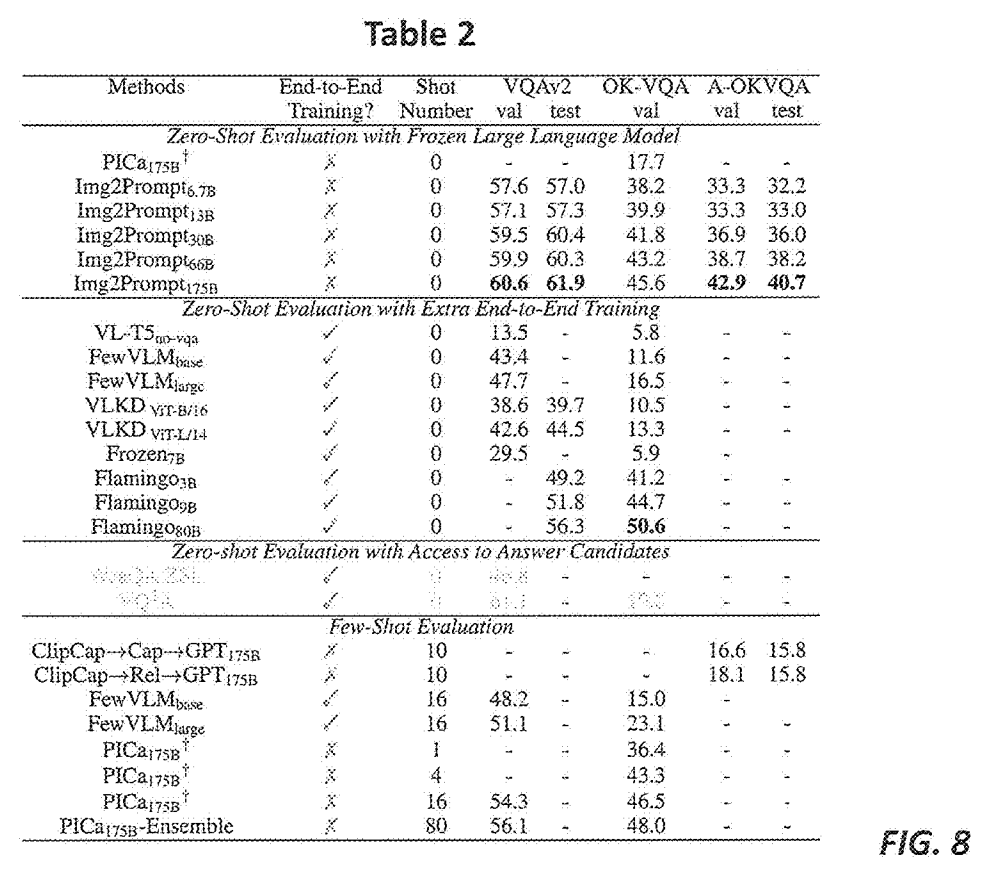

Table 2

| Methods | End-to-End Training? | Shot Number | VQAv2 val | VQAv2 test | OK-VQA val | A-OKVQA val | A-OKVQA test |
|---|---|---|---|---|---|---|---|
| *Zero-Shot Evaluation with Frozen Large Language Model* | | | | | | | |
| PICa$_{175B}$† | X | 0 | - | - | 17.7 | - | - |
| Img2Prompt$_{6.7B}$ | X | 0 | 57.6 | 57.0 | 38.2 | 33.3 | 32.2 |
| Img2Prompt$_{13B}$ | X | 0 | 57.1 | 57.3 | 39.9 | 35.3 | 33.0 |
| Img2Prompt$_{30B}$ | X | 0 | 59.5 | 60.4 | 41.8 | 36.9 | 36.0 |
| Img2Prompt$_{66B}$ | X | 0 | 59.9 | 60.3 | 43.2 | 38.7 | 38.2 |
| Img2Prompt$_{175B}$ | X | 0 | 60.6 | 61.9 | 45.6 | 42.9 | 40.7 |
| *Zero-Shot Evaluation with Extra End-to-End Training* | | | | | | | |
| VL-T5$_{no-vqa}$ | ✓ | 0 | 13.5 | - | 5.8 | - | - |
| FewVLM$_{base}$ | ✓ | 0 | 43.4 | - | 11.6 | - | - |
| FewVLM$_{large}$ | ✓ | 0 | 47.7 | - | 16.5 | - | - |
| VLKD$_{ViT-B/16}$ | ✓ | 0 | 38.6 | 39.7 | 10.5 | - | - |
| VLKD$_{ViT-L/14}$ | ✓ | 0 | 42.6 | 44.5 | 13.3 | - | - |
| Frozen$_{7B}$ | ✓ | 0 | 29.5 | - | 5.9 | - | - |
| Flamingo$_{3B}$ | ✓ | 0 | - | 49.2 | 41.2 | - | - |
| Flamingo$_{9B}$ | ✓ | 0 | - | 51.8 | 44.7 | - | - |
| Flamingo$_{80B}$ | ✓ | 0 | - | 56.3 | 50.6 | - | - |
| *Zero-shot Evaluation with Access to Answer Candidates* | | | | | | | |
| | ✓ | | | | | - | - |
| | ✓ | | | | | - | - |
| *Few-Shot Evaluation* | | | | | | | |
| ClipCap→Cap→GPT$_{175B}$ | X | 10 | - | - | - | 16.6 | 15.8 |
| ClipCap→Rel→GPT$_{175B}$ | X | 10 | - | - | - | 18.1 | 15.8 |
| FewVLM$_{base}$ | ✓ | 16 | 48.2 | - | 15.0 | - | - |
| FewVLM$_{large}$ | ✓ | 16 | 51.1 | - | 23.1 | - | - |
| PICa$_{175B}$† | X | 1 | - | - | 36.4 | - | - |
| PICa$_{175B}$† | X | 4 | - | - | 43.3 | - | - |
| PICa$_{175B}$ | X | 16 | 54.3 | - | 46.5 | - | - |
| PICa$_{175B}$-Ensemble | X | 80 | 56.1 | - | 48.0 | - | - |

*FIG. 8*

Table 3

| PICa$_{175B}$ | | OK-VQA | VQAv2 |
|---|---|---|---|
| | | 17.7 | - |
| Agnostic | Random | 35.9 | 52.9 |
| Template | Random | 40.2 | 53.0 |
| | Max Freq. | 41.5 | 55.8 |
| Neural | Random | 40.5 | 57.0 |
| | Max Freq. | 41.8 | 59.5 |

FIG. 9

Table 4: The experimental results on QA pairs generated from different captions. The results are run with OPT 30B.

| Exemplar Prompts Generation Source | OK-VQA | | | VQAv2 val | | |
|---|---|---|---|---|---|---|
| | VQA Score | Answer Noise Rate | Answer Hit Rate | VQA Score | Answer Noise Rate | Answer Hit Rate |
| Caption from Complete Image | 39.8 | 0.018 | 0.480 | 57.1 | 0.0290 | 0.725 |
| Question-relevant Caption | 40.6 | 0.022 | 0.581 | 58.1 | 0.0303 | 0.821 |
| Question-relevant Caption with Filter | 41.8 | 0.025 | 0.566 | 59.5 | 0.0313 | 0.804 |

*FIG. 10*

Table 5: Ablations on prompts designs.

| Methods | OK-VQA | VQAv2 val |
|---|---|---|
| CQA-CQA-CQA | 37.8 | 52.1 |
| CCC-QAQAQA | 41.8 | 59.5 |

Table 6: Ablation on caption selection methods.

| Caption Selection | Random | Max Frequency | Min Frequency |
|---|---|---|---|
| | 41.3 | 41.1 | 41.8 |

*FIG. 11*

Table 8: The question templates for answers with different part of speech.

| Part of Speech of Answer | Question Templates |
|---|---|
| Noun | What item is this in this picture?<br>What item is that in this picture? |
| Verb | What action is being done in this picture?<br>Why is this item doing in this picture?<br>Which action is being taken in this picture?<br>What action is item doing in this picture?<br>What action is item performing in this picture? |
| Adjective | How to describe one item in this picture?<br>What is item's ADJ TYPE in this picture?<br>What is the ADJ TYPE in this picture? |
| Num | How many things in this picture? |

*FIG. 12*

Table 9: The experimental results of using different number of captions and QA pairs as prompts. The experiments are run on OK-VQA with OPT 30B.

| QA Pairs \ Caption | 0 | 10 | 20 | 30 | 40 | 50 |
|---|---|---|---|---|---|---|
| 0 | 3.3 | 19.6 | 22.7 | 23.4 | 24.0 | 24.8 |
| 10 | 40.9 | 41.6 | 42.1 | 42.1 | 41.9 | 42.2 |
| 20 | 41.2 | 41.3 | 41.3 | 41.7 | 42.2 | 42.0 |
| 30 | 41.0 | 41.0 | 41.7 | 41.8 | 41.6 | 41.5 |
| 40 | 40.3 | 40.7 | 40.6 | 40.3 | 40.3 | 41.1 |
| 50 | 40.6 | 40.6 | 40.7 | 40.9 | 40.6 | 41.1 |

Table 10: The experimental results of using different number of patches to generate question-relevant captions. The experiments are run on OK-VQA with OPT 30B.

| Patch_num | 10 | 20 | 40 | Full |
|---|---|---|---|---|
| | 41.2 | 41.8 | 41.6 | 39.8 |

Table 11: The experimental results of generating different number of question-relevant captions. The experiments are run on OK-VQA with OPT 30B.

| Caption_num | PICa | 10 | 30 | 50 | 100 |
|---|---|---|---|---|---|
| | 17.7 | 38.3 | 40.9 | 41.4 | 41.8 |

*FIG. 13*

Question: What type of profession is the man in red in?
GT Answer: bartender

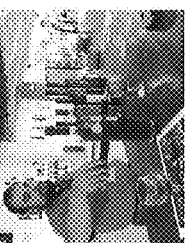

Captions 1: a man in red shirt at a bar making drinks
Captions 2: a man in a red shirt is making a wine tasting
Captions 3: a man in a red shirt at a bar serving a bar Synthetic Question 1: who is pouring a drink at a bar?
Answer: A man
Synthetic Question 2: where is a man in a red shirt making drinks? Answer: A bar
Question: What type of profession is the man in red in?
Predicted Answer: bartender (a)

Question: The girl behind the man likely is of what relation to him?
GT Answer: daughter

Captions 1: a man is riding the back of a little girl on a motorcycle
Captions 2: an image of bearded man and a girl on a motorcycle riding on the motorcycle
Captions 3: man and child sitting on a motorcycle on the street Synthetic Question 1: who is holding on to the bearded man on the back of the motorcycle?
Answer: A girl
Synthetic Question 2: what is the size of the girl riding on the motorcycle?
Answer: little
Question: The girl behind the man likely is of what relation to him?
Predicted Answer: daughter (b)

FIG. 14

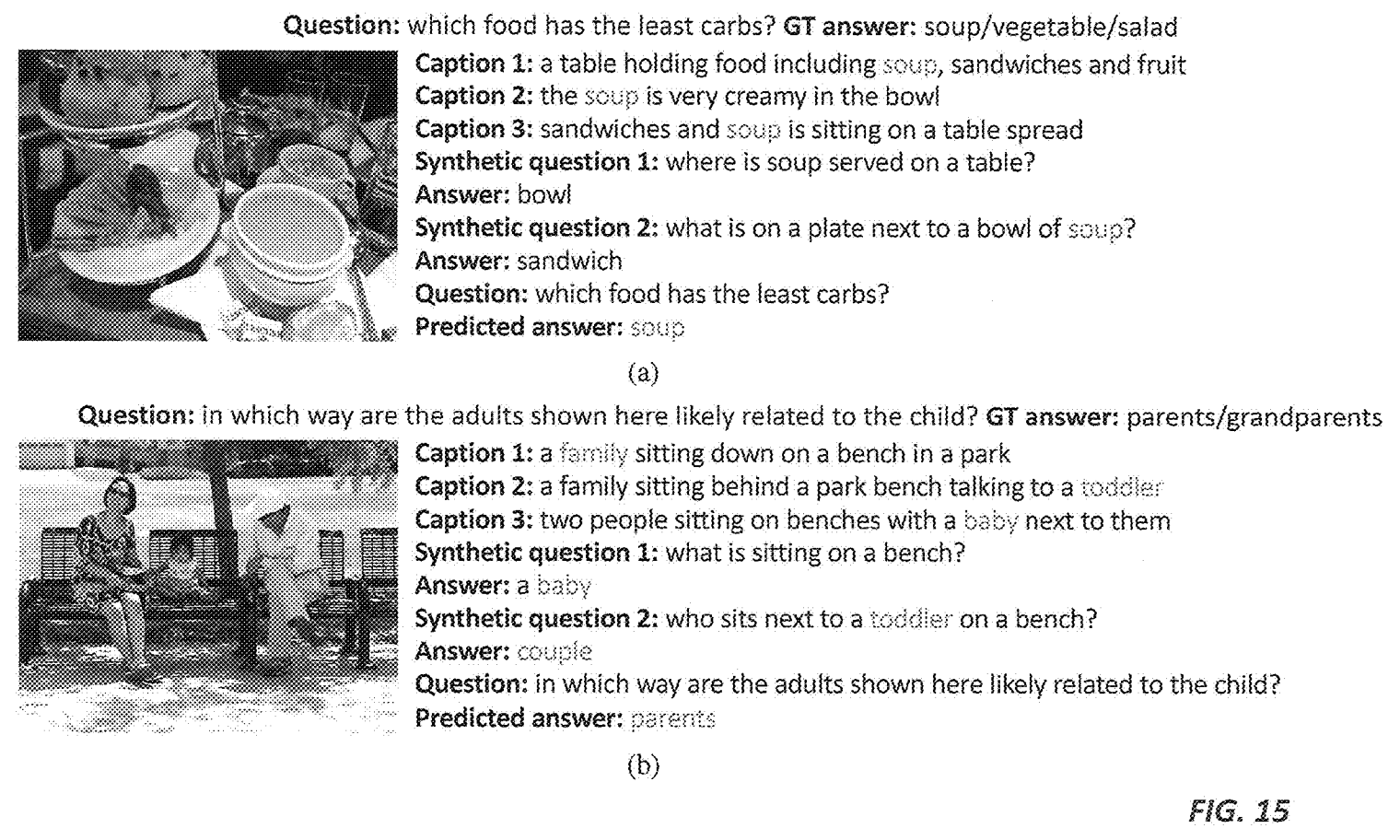

Question: which food has the least carbs? GT answer: soup/vegetable/salad

Caption 1: a table holding food including soup, sandwiches and fruit
Caption 2: the soup is very creamy in the bowl
Caption 3: sandwiches and soup is sitting on a table spread
Synthetic question 1: where is soup served on a table?
Answer: bowl
Synthetic question 2: what is on a plate next to a bowl of soup?
Answer: sandwich
Question: which food has the least carbs?
Predicted answer: soup (a)

Question: in which way are the adults shown here likely related to the child? GT answer: parents/grandparents

Caption 1: a family sitting down on a bench in a park
Caption 2: a family sitting behind a park bench talking to a toddler
Caption 3: two people sitting on benches with a baby next to them
Synthetic question 1: what is sitting on a bench?
Answer: a baby
Synthetic question 2: who sits next to a toddler on a bench?
Answer: couple
Question: in which way are the adults shown here likely related to the child?
Predicted answer: parents (b)

*FIG. 15*

Question: what can the ram eat in this photo? GT answer: grass

Caption 1: the ram is standing outside on the green grass
Caption 2: a ram with white curly horns standing in a field
Caption 3: shaggy coated sheep with horns facing away in the center of a grass field
Synthetic question 1: where is a ram standing?
Answer: grass
Synthetic question 2: what animal is standing in a grassy field?
Answer: sheep
Question: what can the ram eat in this photo?
Predicted answer: grass (a)

Question: what does the sign say? GT answer: stop

Caption 1: a stop sign with cloudy sky behind it
Caption 2: a red stop sign with a sky background
Caption 3: a tall stop sign on a rural road
Synthetic question 1: what color is the stop sign?
Answer: red
Synthetic question 2: what type of sky is behind a stop sign?
Answer: cloudy
Question: what does the sign say?
Predicted answer: stop (b)

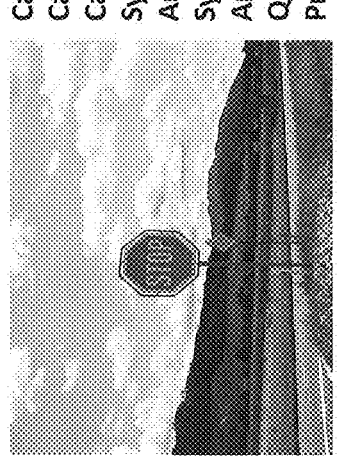

*FIG. 16*

SYSTEMS AND METHODS FOR VISUAL QUESTION ANSWERING USING IMAGE RELEVANT TEXTUAL PROMPTS

CROSS REFERENCE(S)

This instant application is a non-provisional of and claim priority under 35 U.S.C. 119 to U.S. provisional application No. 63/377,462, filed Sep. 28, 2022, which is hereby expressly incorporated by reference herein in its entirety.

TECHNICAL FIELD

The embodiments relate generally to visual models and machine learning systems, and more specifically to zero-shot visual question answering by using image relevant textual prompts including synthetic question-answer pairs.

BACKGROUND

Visual question answering (VQA) is a vision-and-language reasoning task. For example, given an input image of a bowl of salad and a query "what are the black objects" in the image, a VQA model is expected to generate an answer based on the visual content in the image, e.g., "the black objects are olives." Some existing systems adapt pretrained language models (LLMs), also referred to as large language models (LLMs), for the vision modality, which often entails additional new network components and training objectives for the LLMs. Such setting limits the further application and scalability of the designed VQA model.

Therefore, there is a need for developing training-free zero-shot VQA models.

BRIEF DESCRIPTION OF THE DRAWINGS

FIG. 6 is an example logic flow diagram illustrating a method of providing zero-shot VQA using the Img2Prompt VQA model shown in FIG. 1, according to some embodiments described herein.

FIGS. 7-16 provide example experimental results illustrating example data performance of the Img2Prompt VQA model described in relation to FIGS. 1-6, according to some embodiments described herein.

Figure 1:
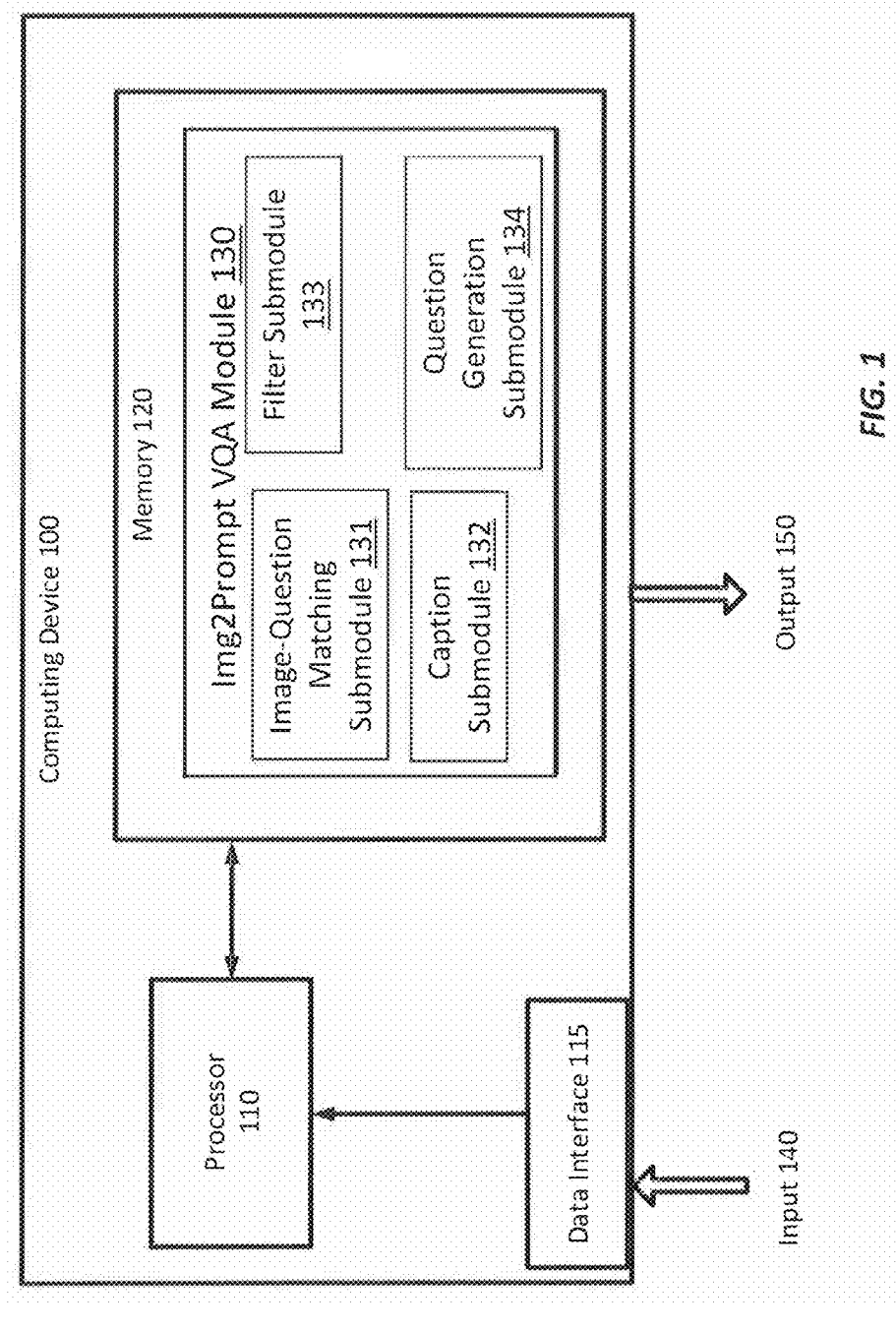
FIG. 1 is a simplified block diagram illustrating the framework of a zero-shot image relevant textual prompts (Img2Prompt) VQA model, according to one embodiment described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Traditionally, pre-trained language models (LLMs), also referred to as pre-trained large language models (LLMs), may be adapted for vision-language tasks, but with significant adaptation such as new network components and training objectives. For example, new layers that are trained from scratch for a vision language task may be inserted into the LLMs. For another example, vision encoders that output soft prompts may be trained together with frozen LLMs. For another example, both the vision encoders and new layers inserted into LLMs may be trained. In the zero-shot setting, various vision-language pretext objectives may be employed, such as image captioning and image-conditioned masked language modeling. These adaptation methods for LLMs may often incur significant computational overhead in re-training.

Difficulties in utilizing LLMs effectively in zero-shot VQA stem mainly from two obstacles: (i) The modality disconnection: LLMs do not natively process images and encoding visual information into a format that LLMs can process can be a challenge. (ii) The task disconnection. LLMs are usually pretrained using generative or denoising objectives on language modeling tasks. As the LLMs are unaware of the tasks of question answering or VQA, they often fail to fully utilize contextual information in generating the answers.

In view of the need for an efficient VQA model, embodiments described herein provide a VQA framework for zero-shot VQA using image-relevant exemplar prompts for the LLM. Specifically, synthetic question-answer pairs are generated as in-context exemplars from the current image of the question. The exemplars not only demonstrate the Question-Answer task, but also communicate the content of the image to the LLM, thereby hitting two birds with one stone. The method is LLM-agnostic; it unlocks the knowledge and the reasoning capacity of off-the-shelf LLMs, offering a powerful yet flexible solution for zero-shot VQA.

For example, with synthetic question-relevant captions and question-answer pairs, complete prompts for LLM may be generated by concatenating the instruction, captions, and QA exemplars.

In this way, the Img2Prompt VQA framework provides visual information and task guidance to LLMs in the format of easily-digestible prompts. This eliminates the requirement for the expensive end-to-end vision-language alignment, and increases model deployment flexibility while decreasing model deployment cost.

FIG. 1 is a simplified diagram illustrating a computing device implementing the VQA framework described throughout the specification, according to one embodiment described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for Img2Prompt VQA module 130 (also referred to as Img2Prompt module 130 or VQA module 130) that may be used to implement and/or emulate the systems and models, and/or to implement any of the methods described further herein. An VQA module 130 may receive input 140 such as an input image and an input question via the data interface 115 and generate an output 150 which may be an answer to the question. Examples of the input data may include an image of a salad bowl, and a question on "what are the black objects in the photo?". Examples of the output data may include an answer "olives."

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140, such as an articulated question, from a user via the user interface.

In some embodiments, the VQA module 130 is configured to generate an answer in response to an image and a question based on the image. The VQA module 130 may further include an image-question matching submodule 131, a caption submodule 132, a filter submodule 133, and a question generation submodule 134, which are all further described below. In one embodiment, the VQA module 130 and its submodules 131-134 may be implemented by hardware, software and/or a combination thereof.

In one embodiment, the VQA module 130 and one or more of its submodules 131-134 may be implemented using one or more artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 120 as a structure of layers of neurons, and parameters describing the non-linear transformation at each neuron and the weights associated with edges connecting the neurons. An example neural network may be a pretrained language model, and/or the like.

In one embodiment, the neural network based VQA module and/or one or more of its submodules 131-134 may be trained by updating the underlying parameters of the neural network based on a loss, e.g., a metric that evaluates how far away a neural network model generates a predicted output value from its target output value (also referred to as the "ground-truth" value). Given the computed loss, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
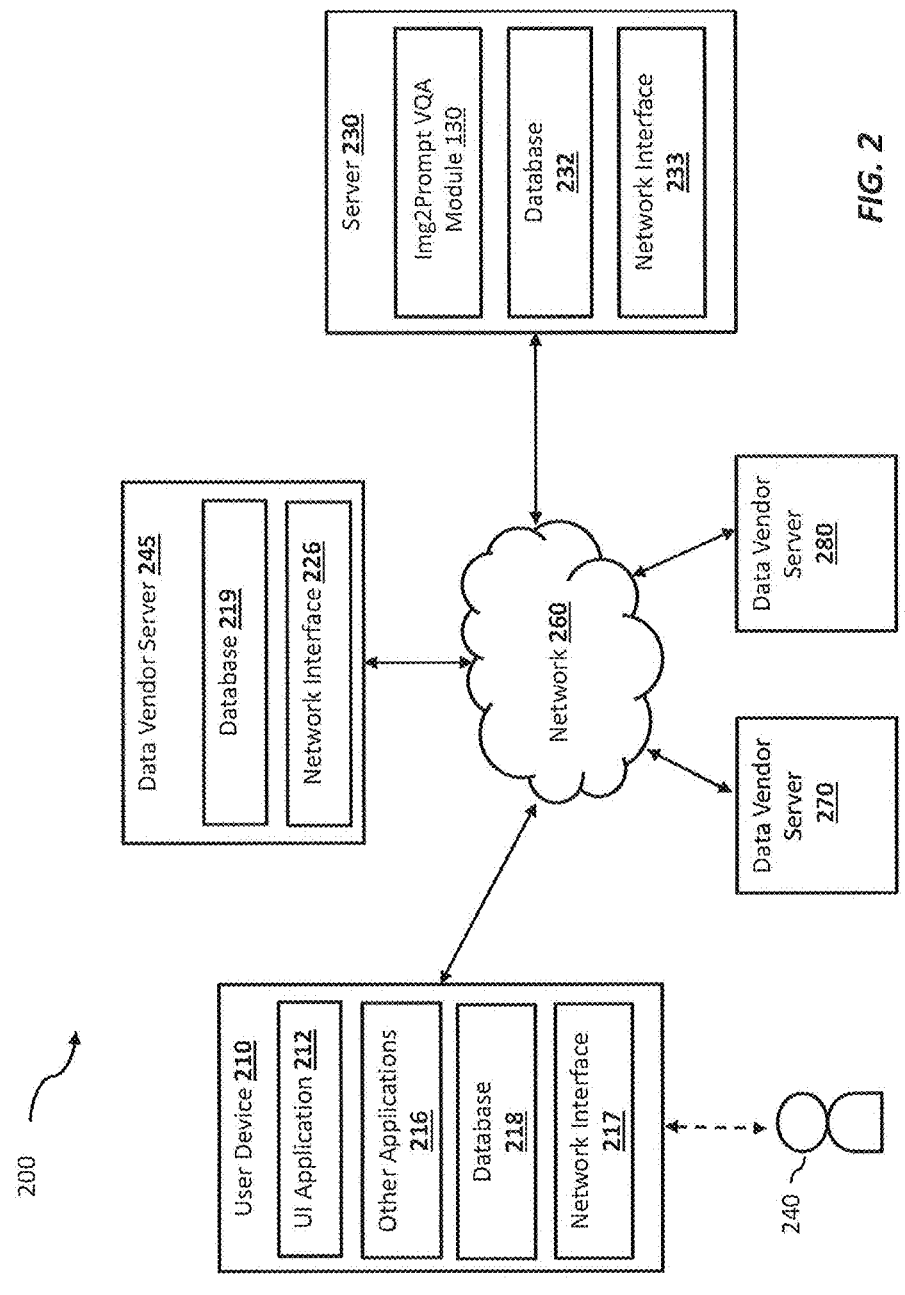
FIG. 2 is a simplified diagram illustrating a computing device implementing the Img2Prompt VQA model described in FIG. 1, according to one embodiment described herein.

FIG. 2 is a simplified block diagram of a networked system suitable for implementing the VQA framework in embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating an answer to a visual question from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the answer.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide training datasets including training images and questions to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the VQA module 130 and its submodules described in FIG. 1. In some implementations, module 130 may receive data from database 219 at the data vendor server 245 via the network 260 to generate an answer to a visual question. The generated answer may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the VQA model 130. In one implementation, the database 232 may store previously generated answers, and the corresponding input feature vectors.

In some embodiments, database 232 may be local to server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
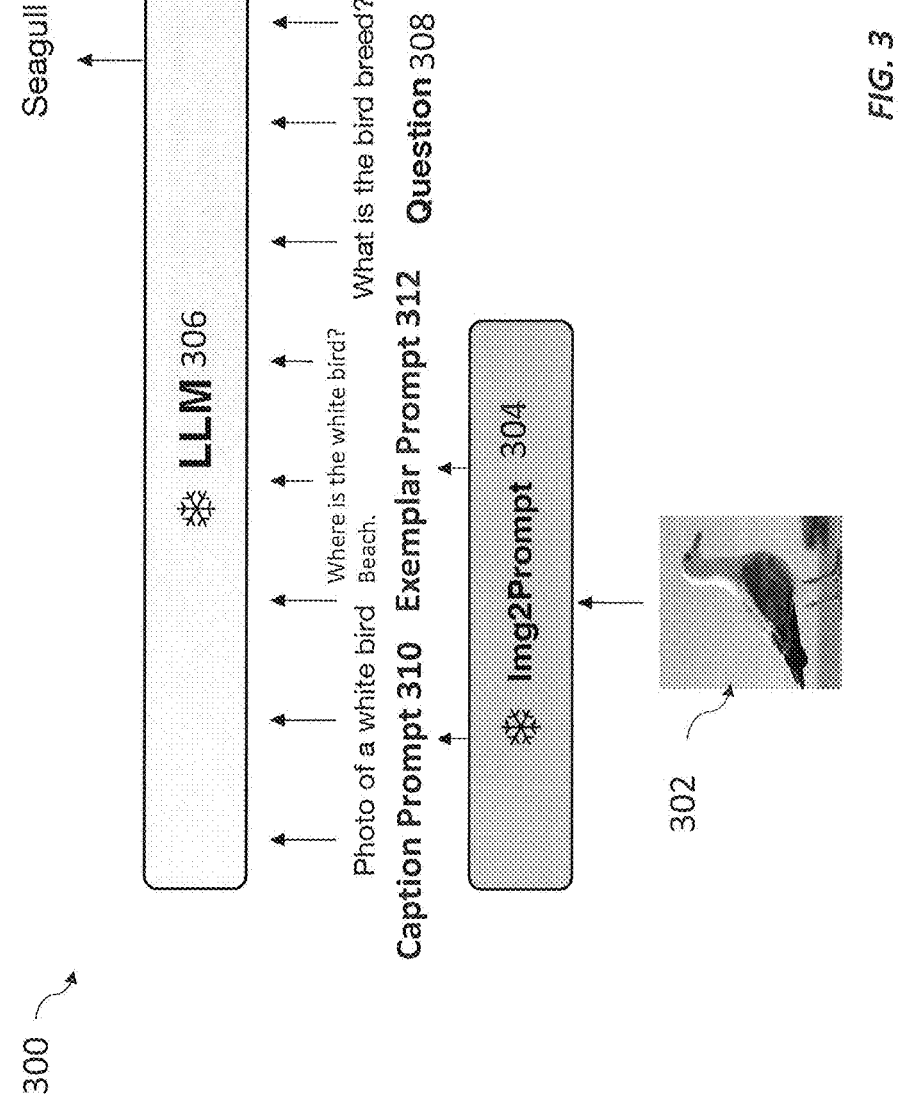
FIG. 3 is a simplified block diagram illustrating an example method of performing a VQA task using a zero-shot Img2Prompt VQA model, according to one embodiment described herein.

FIG. 3 is a simplified block diagram illustrating an example method 300 of performing a VQA task using a zero-shot Img2Prompt VQA model 304, according to one embodiment described herein. As shown in FIG. 3, the Img2Prompt VQA model 304 receives an input image 302 (e.g., an image including a seagull on the beach) and a question 308 ("What is the bird breed?"). The Img2Prompt VQA model 304, based on the input image 302 and the question 308, generates a caption prompt 310 ("Photo of a white bird.") and an exemplar prompt 312 ("Where is the white bird? Beach"). A large language model (LLM) 306 generates the answer ("Seagull") based on the caption prompt 310 and exemplar prompt 312 to the question 308 ("What is the bird breed?"). As shown in FIG. 3, for performing the VQA task, inner parameters of the Img2Prompt VQA model 304 and the LLM 306 are frozen, eliminating the requirement for the expensive end-to-end vision-language alignment (e.g., by training end-to-end the Img2Prompt VQA model 304 including a visual-language neural model with the LLM 306).

Figure 4:
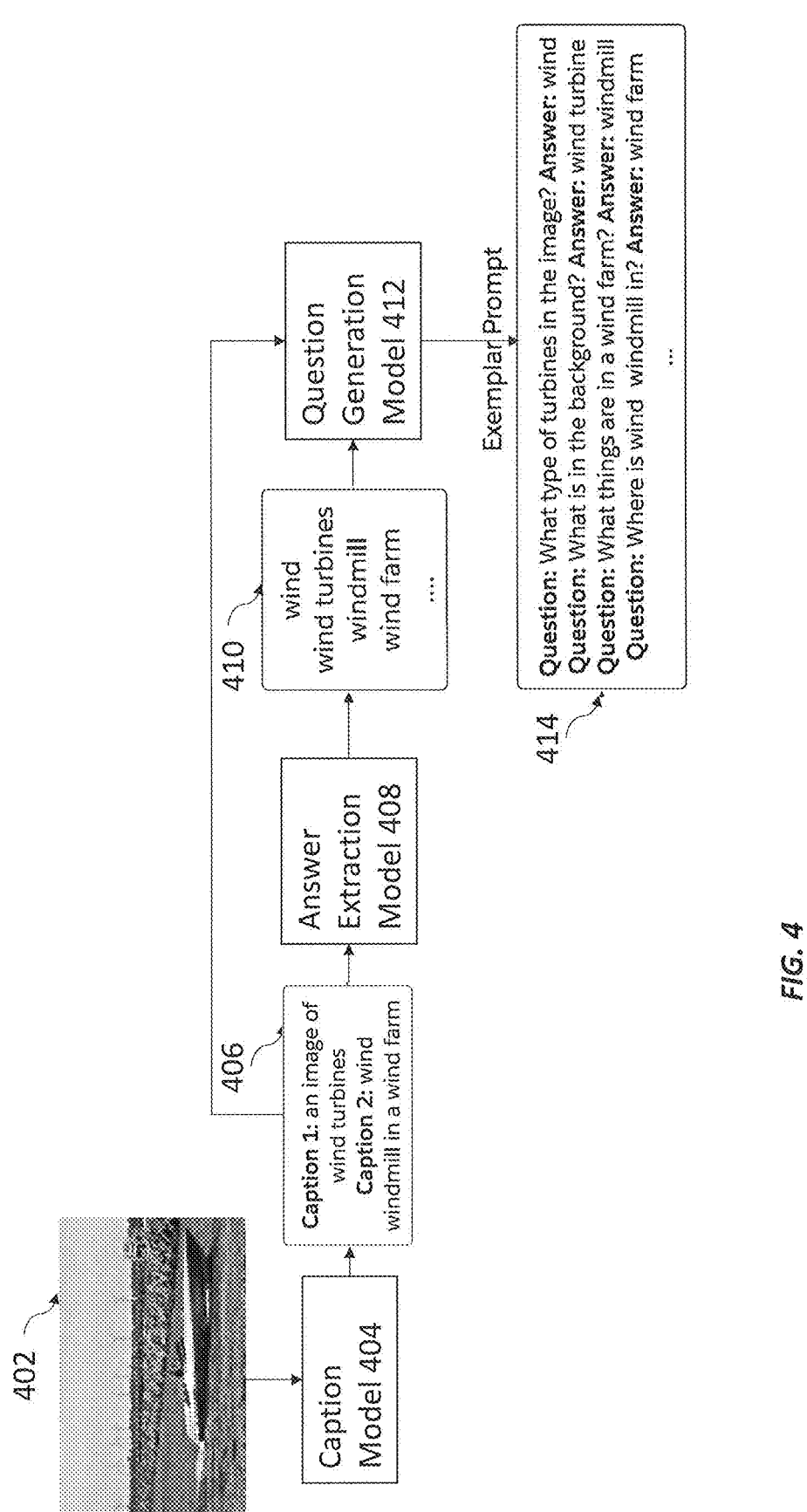
FIG. 4 is a simplified block diagram illustrating answer extraction and question generation adopted by the Img2Prompt VQA model shown in FIG. 1, according to one embodiment described herein.

Referring FIG. 4, illustrated therein is a simplified block diagram illustrating answer extraction and question generation adopted by the Img2Prompt VQA model shown in FIG. 1 for generating the exemplar prompt, according to one embodiment described herein.

As shown in the example of FIG. 4, a caption model 404 of the Img2Prompt VQA model receives an input VQA image 402 (e.g., an image including a boat in the foreground and turbines in the background), and generates one or more captions 406 (e.g., "Caption 1: an image of wind turbines," "Caption 2: wind windmill in a windfarm."). In various embodiments, in order to incorporate the image content into the exemplar prompts for in-context learning, from the current VQA image 402, the Img2Prompt VQA model uses the caption model 404 to seek words that could serve as answers to synthetic questions. The caption model 404 may be implemented using an off-the-shelf image captioning network, or a question-relevant caption generation model (e.g., a question-relevant caption generation model as discussed in detail below with reference to FIG. 5), and generates one or more captions 406.

As shown in the example of FIG. 4, an answer extraction model 408 of the Img2Prompt VQA model may receive the captions 406 generated by the caption model 404, and extract possible answers 410 for synthetic question-answer pairs. For example, the answer extraction model 408 may extract, from captions 406, noun phrases (including named entities), verb phrases, adjective phrases, numbers, boolean-typed words like "yes" and "no," other suitable portions of the captions, and/or a combination thereof as potential answers. Example extracted answer candidates 410 includes for example, "wind," "wind turbines," "windmill," "wind farm."

As shown in the example of FIG. 4, a question generation model 412 of the Img2Prompt VQA model may receive the captions 406 and the extracted answer candidates 410, and generate questions for the extracted answer candidates. Various question generation methods may be used, including e.g., template-based question generation methods and neural question generation methods.

In embodiments where the template-based question generation methods are used to generate the questions, an off-the-shelf parser may be used to perform the template-based question generation. Parts of speech of each answer are differentiated, and specific question templates are designed for each type of the part of the speech. For example, for answer candidates that are nouns, question templates may include, e.g., "What object is in this image?". For further example, for answer candidates that are verbs, question templates may include, e.g., "What action is being taken in this image?," "Why is this item doing in this picture?."

In embodiments where the neural question generation methods are used, a neural question generation model may be used. In some examples, the neural question generation model may be trained on one or more textual question-answer (QA) datasets. In an example, a pretrained T5-large model is finetuned (e.g., using one or more textual QA datasets) to generate questions from answers. In that example, the input to the model contains the prompt "Answer: [answer]. Context: [context]", where [answer] denotes the answer text and [context] denotes the context text from textual QA datasets. During inference, [answer] is replaced with an extracted answer candidate 410 (e.g., "wind turbines") and [context] is replaced with the generated caption 406 (e.g., "Caption 1: an image of wind turbines") from which the answer candidate 410 was extracted.

After the questions are generated for the answer candidates, the question generation model 412 generates exemplar question-answer prompts 414 (also referred to as synthetic exemplar QA pairs 414) using answer candidates and the generated questions. Example QA pairs 414 include "Question: What type of turbines in the image? Answer: wind;" "Question: What is the background? Answer: wind turbine;" "Question: What things are in a wind farm? Answer: windmill;" "Question: Where is wind windmill in? Answer: wind farm."

In various embodiments, the set of synthetic question-answer pairs 414 may be used as exemplars of LLM in-context learning, which guides the LLM to perform QA task given the image content. The set of synthetic question-answer pairs 414 may bridge the task disconnect between language modeling and VQA. Moreover, since the exemplar prompts 414 already describe much content of the image, which helps to bridge the modality disconnection, adding captions on top does not provide much new information and brings only limited performance gains.

Figure 5:
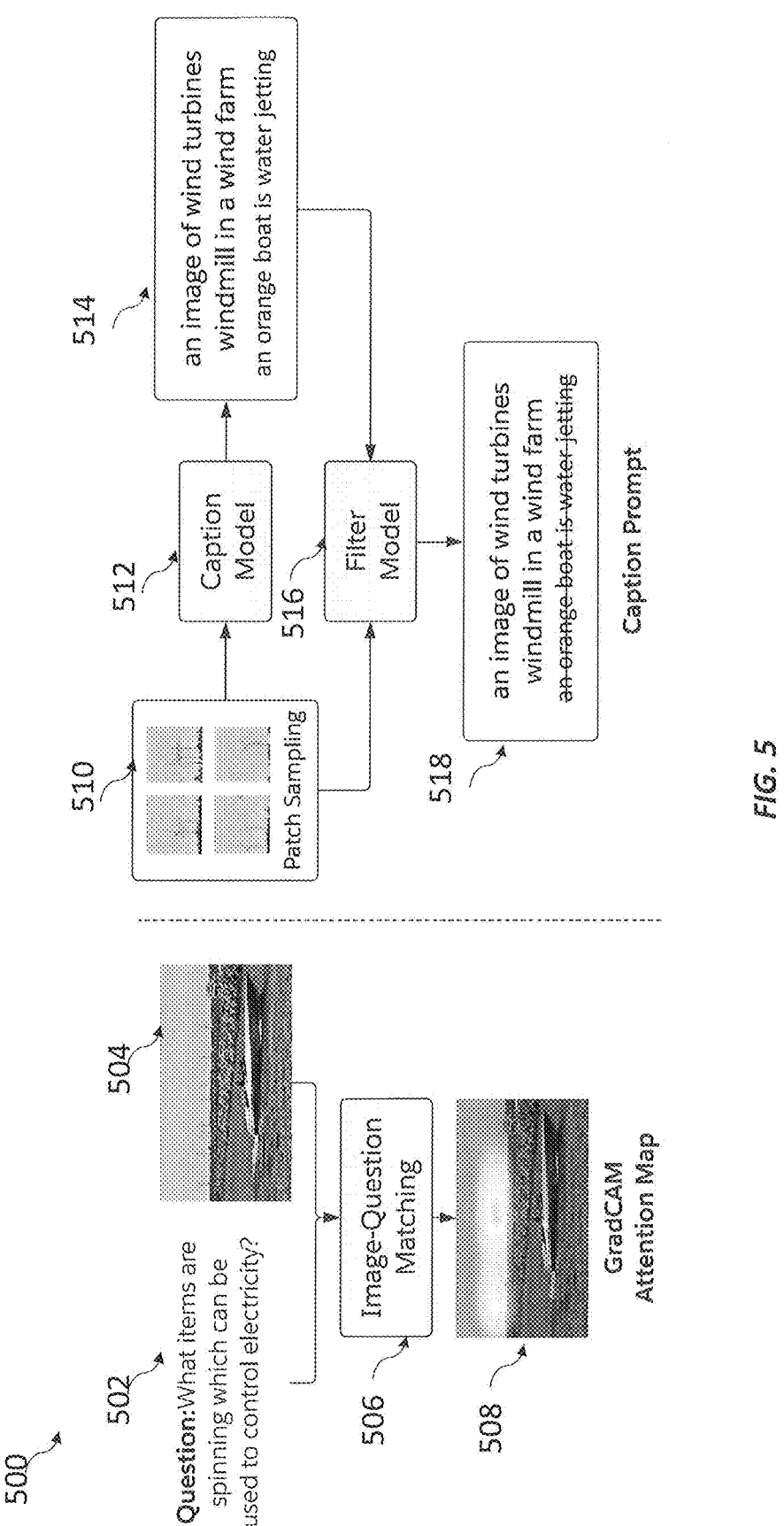
FIG. 5 is a simplified block diagram illustrating caption generation adopted by the Img2Prompt VQA model shown in FIG. 1, according to one embodiment described herein.

FIG. 5 is a simplified block diagram illustrating a caption generation method 500 that may be used by the VQA model shown in FIG. 1, according to one embodiment described herein. The caption generation method 500 may be used to generate captions (e.g., in caption model 404 of FIG. 4) for generating synthetic exemplar QA pairs for exemplar prompt (e.g., exemplar prompt 312). Furthermore, in addition to the synthetic exemplar QA pairs, question-relevant image captions are also supplied to the LLM (e.g., using caption prompt 310 of FIG. 3), and the caption generation method 500 may be used to generate the caption prompt. It is observed that in some generic caption generation methods using existing networks, the question may ask about specific or regions in the image, but the generic captions generated may not contain relevant information. As shown in the example of FIG. 5, the question "What items are spinning in the background which can be used to control electricity?" is relevant only to the wind turbines. However, using conventionally caption generation model, captions generated from the complete image are likely to focus on the salient orange boat in the font, leaving LLM with no information (relevant to the wind turbine) to answer the question.

To address this issue, captions about the question-relevant portion of the image are generated and included in the prompt to the LLM. As shown in the example of FIG. 5, the question 502 (e.g., "What items are spinning which can be used to control electricity?") and the input image 504 are sent to an image-question matching model 506. The image-question matching model 506 may determine the regions of the image that are relevant to the question 502.

In some embodiments, the image-question matching model 506 uses an Image-grounded Text Encoder (ITE) in Bootstrapping Language-Image Pre-training (BLIP) model to determine the question-relevant image regions. Specifically, a similarity score sim(v, q) is assigned to any pair of image v and textual question q. With ITE, a feature-attribution interpretability technique GradCAM is used, to generate a coarse localization map of the input image 504, highlighting matching image regions given a question 502. Briefly, GradCam qualifies the cross-attention scores from the Transformer network by the gradient of ITE similarity function sim(v,q) with respect to the cross-attention scores. Specifically, denote features of image patches extracted by ITE as $$f_v^i \in \mathbb{R}^{K \times D_v^i}$$

and question features as $$f_q^i \in \mathbb{R}^{L \times D_q^i},$$

where i is the number of the layer of ITE, K is the number of images patches, L is the number of token in the given question, $$D_v^i$$

is the dimension of patch feature in the i-th layer of ITE network and $$D_q^i$$

is the dimension of textual feature in the i-th layer of ITE network. For cross-attention head in i-th layer, the cross-attention scores $W^i$ between each image patch and each token in question can be calculated directly as:

$$W^i = softmax\left( \frac{f_q^i W_Q^i W_K^{i^T} f_v^{i^T}}{\sqrt{D_q^i}} \right) \qquad (1)$$

In Equation (1), $$W_Q^i$$

is the query head, and $$W_K^i$$

is the key head in the i-th layer of the ITE network. With Equation (1), a cross-attention matrix Wi is obtained, where each row is the cross-attention scores of each token in the question over all image patches. Specifically, the attention matrix $W^i$ can be regarded as the patch importance for ITE to calculate the similarity of whole image and question, but it still contains redundancy that contributes only a minor performance loss, indicating that some patches are uninformative. In order to find these less relevant image patches, the GradCAM method is used to compute the derivative of the cross-attention score from ITE function sim(v, q), i.e., ∂ sim(v, q)/∂W, and multiplying its gradient matrix with the cross-attention scores element-wisely. The relevance of the $k^{th}$ image patch with the question, $$r_k^i,$$

can be computed as the average over H attention heads and the sum over L textual tokens:

$$r_k^i = \frac{1}{H} \Sigma_{l=1}^{L} \Sigma_{h=1}^{H} \min\left(0, \frac{\partial\, sim(v, q)}{\partial W_{lk}^{ih}}\right) W_{lk}^{ih}, \qquad (2)$$

where h is the index of attention heads and i is the layer index of ITE.

Having obtained the patch relevance r, a subset of image patches is sampled with probability proportional to patch relevance r. After that, caption model 512 is used to generate caption from the sampled image patches 510 using top-k sampling. To generate semantically meaningful captions, a short prompt, "a picture of," may be fed into the text decoder. This process may be repeated M times for each image to generate M diverse captions 514, and only captions that are not exact substrings of others are kept.

However, due to the non-deterministic nature of top-k sampling, the caption model 512 may generate noisy captions (e.g., "an orange boat is water jetting."), which may have a negative impact on performance. To remove noisy captions, ITE may be used to calculate the similarity score between the generated caption and sampled question-relevant image patches. A filter model 516 may be used to filter captions under a threshold matching score (e.g., with less than 0.5 matching scores). For example, the filter model 516 may filter the noisy caption "an orange boat is water jetting" that has a low matching score, and generate filtered captions 518. Overall, this process may yield synthetic captions that are question-relevant, diverse, and clean, providing a bridge between visual and language information.

In various embodiments, with synthetic question-relevant captions and question-answer pairs, complete prompts for LLM are constructed by concatenating the instruction for the QA task, captions, and QA exemplars. An example instruction text is "Please reason the answers of question according to the contexts." The caption prompt may be formatted as "Contexts: [all captions]." Individual QA exemplars may be formatted as "Question: [question text] Answer: [answer text]" and concatenated. The current question may be positioned as the last portion of the prompt, formatted as "Question: [question text]. Answer:". Finally, to get the answer, greedy decoding on the LLM may be performed, and meaningless tokens are removed.

Referring to FIG. 6, illustrated therein is an example logic flow diagram illustrating a method 600 of providing zero-shot VQA using the VQA model shown in FIG. 1, according to some embodiments described herein. The method 600 may begin at block 602, where the VQA model receives an image and a question relevant to the image, for a task of providing an answer to the question.

The method 600 may proceed to block 604, where a question-relevant caption prompt is generated. As discussed at FIGS. 3 and 5, image patches of the input image that are relevant to the question may be determined, and captions may be generated using the relevant image patches. Noisy captions that are not relevant may be filtered. By providing synthetic captions that are question-relevant, diverse, and clean, the question-relevant caption prompt provides a bridge between visual and language information to the LLM.

The method 600 may proceed to blocks 606 through 618, where a QA exemplar prompt is generated, where the QA exemplar prompt includes synthetic question-answer pairs, which provides exemplars of LLM in-context learning, which guides the LLM to perform QA task given the image content. Specifically, at block 606, captions of the image are generated (e.g., using an off-the-shelf caption generation network or question-relevant caption generator as described with reference to FIG. 5). At block 608, answer candidates are extracted, by an answer extraction model, from the captions. At block 610, a question generation model is used to generate questions for the answer candidates. The questions may be generated using question templates (block 614), or use a language neural model (block 616) trained using one or more textual QA datasets. At block 618, a QA exemplar prompt may be generated, e.g., by concatenating the synthetic question-answer pairs.

The method 600 may proceed to block 620, where a task prompt is formulated concatenating the instruction for the QA task, captions, and QA exemplars. At block 622, an input including the task prompt to a pre-trained language neural model to generate an answer to the question, thereby achieving zero-shot VQA by using image relevant textual prompts.

FIGS. 7-16 provide example experimental results illustrating example data performance of the VQA model described in relation to FIGS. 1-6, according to some embodiments described herein. The efficacy of the Img2Prompt VQA model is validated by comparing it with other zero-shot and few-shot VQA methods. Ablation studies are performed on important design choices, such as prompt patterns and caption selection strategies, to understand their effect.

Regarding datasets, the Img2Prompt VQA model is validated on VQAv2 (Goyal et al., 2017), OK-VQA (Marino et al., 2019) and A-OKVQA (Schwenk et al., 2022) datasets, which contain questions requiring perception, reasoning and commonsense to answer. Specifically, VQAv2 (Goyal et al., 2017) contains 214,354 questions in the validation set and 107,394 in the test-dev dataset. OK-VQA (Marino et al., 2019) and A-OK-VQA (Schwenk et al., 2022) emphasize on commonsense reasoning, among which OKVQA contains 5,046 test questions and A-OKVQA (Schwenk et al., 2022) contains 1,100 validation questions and 6,700 test questions.

In some embodiments, to obtain question-relevant caption prompt, BLIP may be used to generate captions and perform image-question matching. To localize the image regions relevant to the question, GradCam from the cross-attention layer of BLIP image-grounded text encoder is used. K'=20 image patches were sampled based on GradCam, where were used to obtain 100 question-relevant captions. Open Pretrained Transformer Language Models (OPT, Zhang et al., 2022), with its 6.7B, 13B, 30B, 66B, 175B variants, is used as LLMs, to illustrate that the Img2Prompt VQA model generalizes to LLMs of different scales. LLMs are used to generate answers auto-regressively, without access to either answer list or training samples, thereby facilitating zero-shot VQA.

Comparison with competing methods are discussed. Prior VQA methods roughly fall into three categories. (i) Zero-shot methods with frozen LLMs, such as PICa (Yang et al., 2022). (ii) Zero-shot methods with extra multi-modal pre-training, such as Flamingo (Alayrac et al., 2022), Frozen (Tsimpoukelli et al., 2021), VL-T5 (Cho et al., 2021), FewVLM (Jin et al., 2022) and VLKD (Dai et al., 2022). These methods require large-scale vision-language datasets and are costly to update. Results from $VQ^2A$ (Changpinyo et al., 2022) and WeaQA (Banerjee et al., 2021) in this category, with caveats that they assume access to answer candidates which may not be available in practice. Therefore, their results should be interpreted with caution. (iii) For reference purposes, available results from few-shot methods are also included. These include few-shot results of PICa (Yang et al., 2022), FewVLM (Jin et al., 2022) and ClipCap Mokady et al. (2021). The Img2Prompt VQA method belongs to the first category (zero-shot methods with frozen LLMs), yet unlike PICa, Img2Prompt requires no training samples to compose the prompts.

Referring to FIG. 7, illustrated is Table 1 showing results from mixing captions and exemplar prompts on 30B OPT. As shown in Table 1, exemplar QA prompts perform considerably better than caption prompts only, demonstrating their efficacy in bridging the task disconnection between LLM pre-training and VQA tasks. Moreover, since the exemplar prompts already describe much content of the image, which helps to bridge the modality disconnection, adding captions on top does not provide much new information and brings only limited performance gains.

Referring to FIG. 8, main quantitative results are shown in Table 2. The findings are summarized as follows:

First, Img2Prompt achieves state-of-the-art results on zero-shot evaluation with plug-in LLMs. Img2Prompt surpasses PICa, the best prior zero-shot model with frozen LLMs, by a significant margin (17.7 versus 45.6 on OK-VQA), thereby establishing a new state-of-the-art. In addition, despite PICa uses frozen LLMs, it requires training samples to build prompts. In contrast, Img2Prompt generates question-answers with no access to VQA samples, thus fully fulfilling the zero-shot requirements.

Second, scaling effect of LLMs and their emergent capabilities on VQA is illustrated. When increasing the number of parameters of LLMs from 6.7B to 175B, there is a 3-10 points improvement in VQA scores across datasets. This shows that stronger language modeling capabilities help better comprehend the question, thus giving more accurate answers. Such a trend is even more clear and consistent on OK-VQA and A-OKVQA, whose questions demand commonsense reasoning and external knowledge that LLMs excel at providing. This corroborates our belief that LLMs are beneficial to VQA.

It is also observed that the effect of scaling LLMs becomes obvious only when the model size becomes sufficiently large, for example, when using 30B or larger models, while not entirely predictable on smaller ones (6.7B and 13B). This echoes with the recent finding on the emergent abilities when using LLMs off-the-shelf (Wei et al., 2022a) for language tasks, while confirming the same trend for the first time when using frozen LLMs for vision(-language) tasks.

Third, Img2Prompt achieves competitive performance with end-to-end pretraining and few-shot models. Img2Prompt obtains superior performance to most models with end-to-end pretraining, as well as those evaluated in few-shot setups. For example, on VQAv2, Img2Prompt surpasses FlamingosoB, which cost over 500K TPU hours and billion-scale datasets to train, by a margin of 5.6 points. On A-OKVQA, Img2Prompt more than doubles the best reported results so far, from ClipClap. The only a few exceptions are on OK-VQA, where Img2Prompt obtains better results than Flamingo9B, yet is not able to stay on par with Flamingo80B. Considering that Img2Prompt is flexible to adapt to updated and stronger LLMs with zero extra training cost, Img2Prompt is a more approachable solution to practical adoption of VQA systems, than those trained end-to-end.

Referring to FIG. 9, the analysis on questions generation methods is provided. Table 3 of FIG. 9 shows the performance of different question selection strategies. Three question generation techniques are shown: image-agnostic, which uses questions sampled from other images (for comparison purpose); template-based, which uses template questions, and neural-based, which uses neural generated questions. Further, two synthetic QA selection strategies are compared: the random strategy, which selects QA pairs for prompt randomly; and the max freq. approach, which selects answer candidates that are most frequent in the captions, and also retrieve the associated synthetic questions to build the prompt.

As shown in Table 3 of FIG. 9, among the three question generation techniques, Agnostic perform the worst whereas Neural performs the best, because of the differences in the quality of QA pairs generated by these different techniques. Specifically, Agnostic QA pairs contain information irrelevant to the current image and may mislead the LLM, and as such, Agnostic performs the worst. Template questions feature little linguistic variation and hence cannot demonstrate different QA strategies. Neural has the most relevant information and the most linguistic diversity. QA pair with maximum answer frequency outperform random questions. It could be that the most frequent answers describe the most salient or important aspects of the image, thereby providing more information than random questions.

Referring to Table 4 of FIG. 10, visual information quality encoded in the exemplar prompts is evaluated using the answer hit rate and the answer noise rate. Answer hit rate (AHR) is defined as the proportion of QA pairs containing the ground-truth answer. Answer noise rate (ANR) is defined as the ratio of ground-truth answers to the total number tokens in the exemplar prompts. Table 4 of FIG. 10 indicates that exemplar prompts generated from question-relevant captions have a higher AHR, hence enhancing the VQA performance. In addition, the caption filter procedure can remove some noisy captions, allowing it to achieve a higher ANR than its competitors. The experimental results demonstrate that improving both the AHR and the ANR can improve the quality of prompts and VQA performance.

Referring to FIG. 11, ablation study is performed. Table 5 of FIG. 11 illustrates ablation study on prompt design. Two options to construct LLM's prompt are studied. The first option is to append a synthetic QA pair after the caption that the QA pair is generated from. This can be described as CQA-CQA-CQA, where C, Q, A stand for caption, synthetic question, and synthetic answer respectively. Alternatively, all captions at once are presented at once, followed by all question-answer pairs, which we denote as CCC-QAQAQA. Experimentally (Table 5), the second design performs significantly better than the first. This could be that the first design may induce the LLM to read only one caption before answering, since in the prompt this caption contains all the information needed for the question. While it is hard to pinpoint the actual mechanism, the results highlight the importance of QA prompts and their positions.

Referring to Table 6 of FIG. 11, the performance of different caption selection strategies is studied, where Max Frequency selects captions containing 30 answers with highest frequencies and Min Frequency selects answers with the lowest frequencies. As the exemplar prompts are produced with answers with the highest frequencies, the Max Frequency strategy does not provide more information than exemplar prompts. In contrast, the Min Frequency strategy chooses captions that can provide some information not in the QA pairs, providing a performance boost.

Referring to FIG. 12, Table 8 illustrates example question templates for each part of speech type of answers, which may be used to generate questions for possible answer candidates in generating the synthetic question-answer pairs.

Referring to FIG. 13, Table 9 illustrates the experimental comparisons between Img2prompt and supervised model on A-OKVQA dataset (Schwenk et al., 2022). As shown in Table 9, Img2prompt outperforms almost all supervised model with smaller size language model. This strongly support Img2prompt's effectiveness in leveraging reasoning power of large language models.

Sensitive analysis about the QA pairs and number of captions in prompt for LLM is performed as shown in Tables 9, 10, and 11 of FIG. 13. As shown in Table 9, the differences in QA scores on OK-VQA dataset are not higher than 1 as long as QA pairs in prompts. The results demonstrate the performance of Img2Prompt method is robust with different numbers of QA pairs and captions.

Referring to FIGS. 14, 15, and 16, various examples of caption and exemplar prompts and the predictions are illustrated. For example, in FIG. 14(*a*), the captions and the synthetic QA pairs provide the information that a man is making drinks at a bar. The LLM draws on background knowledge and correctly infers that his job is bartender. For further example, in FIG. 14(*b*), the captions and the synthetic QA pairs provide the information that a little girl is riding on the motorcycle with a man. The LLM draws on the information of the relationship of the persons, and correctly infers that the girl is the daughter of the man. FIGS. 15 and 16 provide additional examples of caption and exemplar prompts and the predictions.

Accordingly, the Img2Prompt VQA model provides a plug-and-play module designed to exploit the knowledge and reasoning power of large language models (LLMs) off-the-shelf for zero-shot VQA tasks. Concretely, Img2Prompt provides visual information and task guidance to LLMs in the format of easily-digestible prompts. This eliminates the requirement for the expensive end-to-end vision-language alignment, increasing model deployment flexibility while decreasing model deployment cost. The experiments show that Img2Prompt enables different LLMs to achieve comparable or even superior zero-shot VQA performance to other methods that require costly end-to-end training.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of zero-shot visual question answering, the method comprising:
   receiving, via a data interface, a first image and a first question relating to a visual content of the first image;
   determining, using an image-question matching model, one or more question-relevant image regions of the first image;
   determining, using a visual-language neural network model, one or more image patches of the first image relevant to the first question wherein the image patches are selected based at least in part on a patch-level relevance score derived from the one or more question-relevant image regions;
   generating, using a caption model, one or more image captions based on the one or more image patches of the first image;
   extracting, using an answer extract model, answer candidates from the one or more image captions;
   generating synthetic questions using the answer candidates;

generating synthetic question-answer pairs using the synthetic questions and the answer candidates;
   generating a question-answer prompt by concatenating the synthetic question-answer pairs; and
   generating, using a first language neural network model, a first answer to the first question using an input of the first question prepended with the question-answer prompt.

2. The method of claim 1, further comprising:
   generating a caption prompt using the one or more image captions relevant to the first question; and
   generating the input to the first language neural network model by concatenating the caption prompt, the question-answer prompt, and the first question.

3. The method of claim 1, wherein the generating the synthetic questions using the answer candidates includes:
   generating, using question templates, the synthetic questions,
      wherein the question templates are determined based on types of the answer candidates.

4. The method of claim 3, wherein the types of the answer candidates include at least one or more of nouns, verbs, adjectives, and numbers.

5. The method of claim 1, wherein the generating the synthetic questions using the answer candidates includes:
   generating, using a second language neural network model, the synthetic questions using the answer candidates.

6. The method of claim 5, wherein the second language neural network model is trained on one or more textual question-answer datasets for generating questions from answers.

7. The method of claim 6, wherein during the training the second language neural network model, an input to the second language neural network model is generated by concatenating an answer text and a corresponding context text from the question-answer datasets.

8. A system for providing zero-shot visual question answering, the system comprising:
   a memory that stores a zero-shot visual question answering model and a plurality of processor-executable instructions;
   a communication interface that receives a first image and a first question relating to a visual content of the first image; and
   one or more hardware processors that read and execute the plurality of processor-executable instructions from the memory to perform operations comprising:
      determining, using an image-question matching model, one or more question-relevant image regions of the first image;
      determining, using a visual-language neural network model, one or more image patches of the first image relevant to the first question wherein the image patches are selected based at least in part on a patch-level relevance score derived from the one or more question-relevant image regions;
      generating, using a caption model, one or more image captions based on the one or more image patches of the first image;
      generating, using the one or more image captions, answer candidates;
      generating synthetic questions using the answer candidates;
      generating synthetic question-answer pairs using the synthetic questions and the answer candidates;

generating a question-answer prompt by concatenating the synthetic question-answer pairs; and generating, using a first language neural network model, a first answer to the first question using an input of the first question prepended with the question-answer prompt.

9. The system of claim 8, wherein the operations further comprise:

generating a caption prompt using the one or more image captions relevant to the first question; and generating the input to the first language neural network model by concatenating the caption prompt, the question-answer prompt, and the first question.

10. The system of claim 8, wherein the generating the synthetic questions using the answer candidates includes:

generating, using question templates, the synthetic questions, wherein the question templates are determined based on types of the answer candidates.

11. The system of claim 10, wherein the types of the answer candidates include at least one or more of nouns, verbs, adjectives, and numbers.

12. The system of claim 8, wherein the generating the synthetic questions using the answer candidates includes:

generating, using a second language neural network model, the synthetic questions using the answer candidates.

13. The system of claim 12, wherein the second language neural network model is trained on one or more textual question-answer datasets for generating questions from answers.

14. The system of claim 13, wherein during the training the second language neural network model, an input to the second language neural network model is generated by concatenating an answer text and a corresponding context text from the question-answer datasets.

15. A non-transitory machine-readable medium comprising a plurality of machine-executable instructions which, when executed by one or more processors, are adapted to cause the one or more processors to perform operations comprising:

receiving, via a data interface, a first image and a first question relating to a visual content of the first image;

determining, using an image-question matching model, one or more question-relevant image regions of the first image;

determining, using a visual-language neural network model, one or more image patches of the first image relevant to the first question wherein the image patches are selected based at least in part on a patch-level relevance score derived from the one or more question-relevant image regions;

generating, using a caption model, one or more image captions based on the one or more image patches of the first image;

generating, using the one or more image captions, answer candidates;

generating synthetic questions using the answer candidates;

generating synthetic question-answer pairs using the synthetic questions and the answer candidates;

generating a question-answer prompt by concatenating the synthetic question-answer pairs; and generating, using a first language neural network model, a first answer to the first question using an input of the first question prepended with the question-answer prompt.

16. The non-transitory machine-readable medium of claim 15, wherein the operations further comprise:

generating a caption prompt using the one or more image captions relevant to the first question; and generating the input to the first language neural network model by concatenating the caption prompt, the question-answer prompt, and the first question.

17. The non-transitory machine-readable medium of claim 15, wherein the generating the synthetic questions using the answer candidates includes:

generating, using question templates, the synthetic questions, wherein the question templates are determined based on types of the answer candidates.

18. The non-transitory machine-readable medium of claim 17, wherein the types of the answer candidates include at least one or more of nouns, verbs, adjectives, and numbers.

19. The non-transitory machine-readable medium of claim 15, wherein the generating the synthetic questions using the answer candidates includes:

generating, using a second language neural network model, the synthetic questions using the answer candidates.

20. The non-transitory machine-readable medium of claim 19, wherein the second language neural network model is trained on one or more textual question-answer datasets for generating questions from answers.

* * * * *